United States Patent
Lu et al.

(10) Patent No.: US 12,463,308 B2
(45) Date of Patent: Nov. 4, 2025

(54) BATTERY, BATTERY MODULE, BATTERY PACK, AND ELECTRIC VEHICLE

(71) Applicant: BYD COMPANY LIMITED, Guangdong (CN)

(72) Inventors: Kewei Lu, Shenzhen (CN); Xiaowen Mu, Shenzhen (CN); Yanchu Liu, Shenzhen (CN); Jingyan Zhu, Shenzhen (CN); Xuan Yu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 708 days.

(21) Appl. No.: 17/778,672

(22) PCT Filed: Oct. 27, 2020

(86) PCT No.: PCT/CN2020/124108
§ 371 (c)(1),
(2) Date: May 20, 2022

(87) PCT Pub. No.: WO2021/098456
PCT Pub. Date: May 27, 2021

(65) Prior Publication Data
US 2022/0416379 A1    Dec. 29, 2022

(30) Foreign Application Priority Data
Nov. 22, 2019   (CN) .......................... 201911158425.4

(51) Int. Cl.
*H01M 10/0565* (2010.01)
*H01M 10/0585* (2010.01)
(Continued)

(52) U.S. Cl.
CPC ....... *H01M 50/59* (2021.01); *H01M 10/0565* (2013.01); *H01M 10/0585* (2013.01);
(Continued)

(58) Field of Classification Search
CPC ............ H01M 50/59; H01M 10/0565; H01M 10/0585; H01M 10/654; H01M 10/658;
(Continued)

(56) References Cited

U.S. PATENT DOCUMENTS

2006/0028170 A1* 2/2006 Izawa ............... H01M 10/6557
                                                        320/107
2008/0249257 A1* 10/2008 Masuko ............. C08G 18/6484
                                                        525/452
(Continued)

FOREIGN PATENT DOCUMENTS

CN        201307620 Y      9/2009
CN        102299386 A     12/2011
(Continued)

OTHER PUBLICATIONS

International Search Report and Written Opinion for Application No. PCT/CN2020/124108, mailed on Jan. 28, 2021, 10 pages.

*Primary Examiner* — Lisa S Park
(74) *Attorney, Agent, or Firm* — Sheppard Mullin Richter & Hampton LLP

(57) ABSTRACT

Disclosed are a battery, a battery module, a battery pack, and an electric vehicle. The battery includes a housing and at least two electrode core sets connected in series with each other and each including at least one electrode core (4). The electrode core (4) includes a positive plate, a negative plate, and an electrolyte located between the positive plate and the negative plate. The electrolyte is a solid electrolyte or a polymer electrolyte. Isolation layers (43) are arranged between opposite surfaces of two adjacent electrode core sets. Each isolation layer (43) is formed by curing an insulation adhesive coated on at least one of the opposite surfaces of the two adjacent electrode core sets.

18 Claims, 5 Drawing Sheets

(51) Int. Cl.
*H01M 10/654* (2014.01)
*H01M 10/658* (2014.01)
*H01M 50/103* (2021.01)
*H01M 50/15* (2021.01)
*H01M 50/159* (2021.01)
*H01M 50/209* (2021.01)
*H01M 50/533* (2021.01)
*H01M 50/534* (2021.01)
*H01M 50/586* (2021.01)
*H01M 50/59* (2021.01)

(52) U.S. Cl.
CPC ....... *H01M 10/654* (2015.04); *H01M 10/658* (2015.04); *H01M 50/103* (2021.01); *H01M 50/15* (2021.01); *H01M 50/159* (2021.01); *H01M 50/209* (2021.01); *H01M 50/533* (2021.01); *H01M 50/534* (2021.01); *H01M 50/586* (2021.01); *H01M 2220/20* (2013.01)

(58) Field of Classification Search
CPC .. H01M 50/103; H01M 50/15; H01M 50/159; H01M 50/209; H01M 50/533; H01M 50/534; H01M 50/586; H01M 2220/20; H01M 50/502; H01M 50/593; H01M 50/249; H01M 50/213; H01M 50/258; H01M 50/293; Y02E 60/10; Y02P 70/50
See application file for complete search history.

(56) References Cited

U.S. PATENT DOCUMENTS

| | | | | |
|---|---|---|---|---|
| 2013/0137796 A1* | 5/2013 | Kropp | .................... | C08G 59/42 |
| | | | | 523/428 |
| 2015/0140419 A1 | 5/2015 | Duffield et al. | | |
| 2015/0303425 A1* | 10/2015 | Kong | .................... | H01M 50/293 |
| | | | | 429/152 |
| 2016/0276637 A1* | 9/2016 | Kusaba | ................ | H01M 50/291 |
| 2017/0155102 A1 | 6/2017 | Chung et al. | | |
| 2017/0309946 A1* | 10/2017 | Honda | .................... | B32B 15/00 |
| 2019/0198843 A1* | 6/2019 | Pellenc | .............. | H01M 50/522 |
| 2020/0227707 A1* | 7/2020 | Idikurt | .............. | H01M 10/6554 |
| 2020/0270423 A1* | 8/2020 | Inada | ........................ | C08K 7/10 |
| 2021/0028414 A1* | 1/2021 | Cho | .................... | H01M 50/227 |

FOREIGN PATENT DOCUMENTS

| | | | |
|---|---|---|---|
| CN | 203690420 U | | 7/2014 |
| CN | 104471740 A | | 3/2015 |
| CN | 105489946 | * | 4/2016 |
| CN | 106299167 A | | 1/2017 |
| CN | 206059445 U | | 3/2017 |
| CN | 106883724 A | | 6/2017 |
| CN | 107615549 A | | 1/2018 |
| CN | 107634172 A | | 1/2018 |
| CN | 109755650 A | | 5/2019 |
| CN | 209592121 U | | 11/2019 |
| JP | 36-23248 U | | 9/1961 |
| JP | 36-23746 U | | 9/1961 |
| JP | H06267529 A | | 9/1994 |
| JP | 2013093291 A | | 5/2013 |
| JP | 2013222504 A | | 10/2013 |
| JP | 2014082162 A | | 5/2014 |
| JP | 2015032495 | * | 2/2015 |
| KR | 20140046614 A | | 4/2014 |
| KR | 20150111160 | * | 10/2015 |
| KR | 20150111160 A | | 10/2015 |
| WO | WO-2019203431 A1 * | 10/2019 | ............. B60L 50/50 |

* cited by examiner

BATTERY, BATTERY MODULE, BATTERY PACK, AND ELECTRIC VEHICLE

CROSS-REFERENCE TO RELATED APPLICATIONS

This application is a National Phase Application of International Patent Application No. PCT/CN2020/124108, filed on Oct. 27, 2020, which is based on and claims priority to and benefits of Chinese Patent Application No. 201911158425.4, filed on Nov. 22, 2019 and entitled "BATTERY, BATTERY MODULE, BATTERY PACK, AND ELECTRIC VEHICLE". The entire content of all of the above-referenced applications is incorporated herein by reference.

FIELD

The disclosure relates to the technical field of batteries, and more specifically, to a battery, a battery module, a battery pack, and an electric vehicle.

BACKGROUND

Lithium-ion batteries are novel pollution-free recycled batteries, and are widely used in many fields, especially used as a power battery for a new energy automobile. With increasing popularization and gradual performance improvement of the new energy automobile, users impose increasingly high requirements for mileage and dynamic performance of the new energy automobile. Therefore, increasingly high use requirements are imposed on power batteries of the new energy automobile. A battery pack used in the new energy automobiles is required to have an increasingly high overall capacity but a minimized total weight. Generally, the new energy automobile uses a storage battery having a very large capacity, but one cell cannot provide a sufficient capacity. Therefore, multiple cells are usually required to be arranged side by side. Therefore, a total weight of the battery pack is not insignificant. A lightweight design of the battery pack is of great significance for a lightweight design of the new energy automobile.

Currently, although some battery module structures in related arts may be connected in series in combinations, requirements such as lightweight, low costs, and high-energy density of lithium-ion batteries cannot be satisfied due to a large number of structural components that are used.

In view of this, it is necessary to provide a new technical solution, so as to resolve the foregoing problem.

SUMMARY

This disclosure provides a new technical solution including a battery, a battery module, a battery pack, and an electric vehicle.

A first aspect of the disclosure provides a battery, which includes:
a housing; and
at least two electrode core sets, connected in series with each other, and each electrode core set including at least one electrode core. The electrode core includes a positive plate, a negative plate, and an electrolyte located between the positive plate and the negative plate. The electrolyte is a solid electrolyte or a polymer electrolyte.

An isolation layer is arranged between opposite surfaces of two adjacent electrode core sets. The isolation layer comprises a cured an insulation adhesive coated on at least one of the opposite surfaces of the two adjacent electrode core sets.

In an embodiment, the insulation adhesive includes a resin adhesive and a curing agent add into the resin adhesive.

In an embodiment, the resin adhesive is an air-curing adhesive or a thermosetting adhesive.

In an embodiment, the resin adhesive comprises at least one of epoxy resin, polyurethane resin, polyimide, or polyesterimide.

In an embodiment, a curing temperature for the curing agent ranges from 25° C. to 100° C.

In an embodiment, the curing agent comprises at least one of aliphatic polyamine, alicyclic polyamine, low molecular polyamide, modified aromatic amine, tertiary amine, imidazole, or boron trifluoride complex.

In an embodiment, the insulation adhesive further includes a plasticizer and a filler that are added to the resin adhesive.

In an embodiment, the plasticizer comprises at least one of an aliphatic dibasic acid ester plasticizer, a polymeric benzoate ester plasticizer, an epoxy plasticizer, or a polyester plasticizer.

In an embodiment, the filler comprises at least one of a silicate filler, a calcium carbonate filler, or a cellulose filler.

In an embodiment, the isolation layer is arranged on each of the opposite surfaces of the two adjacent electrode core sets.

In an embodiment, the housing includes a housing body having an end portion with an opening and a cover plate arranged at the opening of the housing body. Grooves are provided on the cover plate; conductive connecting sheets are embedded in the grooves. Each of the conductive connecting sheets is configured to connect two adjacent electrode core sets in series.

In an embodiment, the conductive connecting sheets and the cover plate are made of a metal material. An insulation layer is arranged on an outer surface of the conductive connecting sheet for insulation from the cover plate.

In an embodiment, each of the at least two electrode core sets includes two end surfaces and lateral surfaces located between the two end surfaces. The opposite surfaces of the two adjacent electrode core sets are the lateral surfaces; and the isolation layer is arranged on at least one of the lateral surfaces of the two adjacent electrode core sets.

In an embodiment, each of the at least two electrode core sets includes two end surfaces and lateral surfaces located between the two end surfaces. The isolation layer is arranged on each of the lateral surfaces of each electrode core set.

In an embodiment, each of the at least two electrode core sets includes two end surfaces and lateral surfaces located between the two end surfaces. The opposite surfaces of the two adjacent electrode core sets are the end surfaces; and the isolation layer is arranged on at least one of the end surfaces of the two adjacent electrode core sets.

A second aspect of the disclosure provides a battery module. The battery module includes at least two batteries described above.

A third aspect of the disclosure provides a battery pack. The battery pack includes at least two batteries described above or at least one battery module described above.

A fourth aspect of the disclosure provides an electric vehicle. The electric vehicle includes the battery module described above or the battery pack described above.

In the battery provided in the disclosure, the at least two electrode core sets are connected in series in an accommodating cavity of the housing, that is to say, the at least two electrode core sets share the housing. Therefore, in the disclosure, the number of housings and external mounting structures are reduced, thereby reducing a weight of the battery. In addition, the isolation layer is arranged between the two adjacent electrode core sets. The isolation layer is formed by curing an insulation adhesive coated on at least one of the opposite surfaces of the two adjacent electrode core sets. Therefore, even if the two adjacent electrode core sets come into contact with each other when the battery is squeezed or collided, by means of the isolation of the isolation layer formed by the insulation adhesive, a short circuit and ionic interaction does not occur between the electrode core sets connected in series, thereby ensuring use reliability and safety of the battery. In addition, the isolation layer can provide heat insulation between the electrode core sets. The isolation layer is formed by curing the insulation adhesive coated on the at least one of the opposite surfaces of the two adjacent electrode core sets. Therefore, an isolation member such as a separator arranged between the electrode core sets is omitted, and use of redundant structural components is minimized. In this way, convenient mounting is achieved, and an assembling process is simple. In addition, compared with the solution of arranging the separator, the weight of the battery can be effectively reduced, thereby facilitating the lightweight design of the battery and reducing costs.

Other features and advantages of this application are apparent from the following detailed description of embodiments of this application with reference to the accompanying drawings.

BRIEF DESCRIPTION OF THE DRAWINGS

Accompanying drawings are incorporated into and constitute a part of this specification, show embodiments that conform to this application, and are used together with this specification to describe the principle of this application.

DETAILED DESCRIPTION

Figure 1:
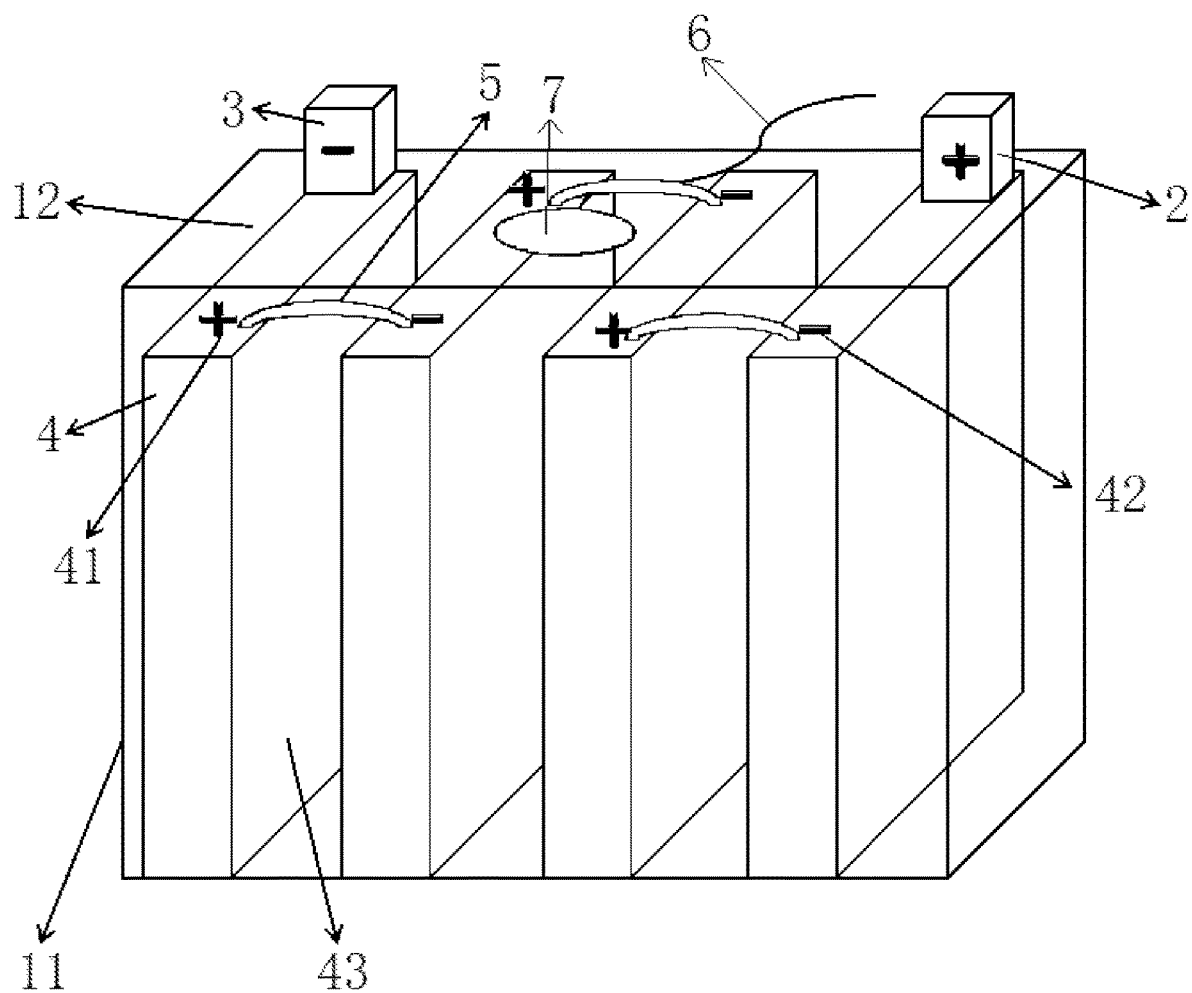
FIG. 1 is a schematic structural perspective view of a battery according to the disclosure.

Various embodiments of this application are now be described in detail with reference to the accompanying drawings. It is to be noted that, unless otherwise specified, relative arrangement, numerical expressions, and numerical values of components and steps described in the embodiments do not limit the scope of the disclosure.

In fact, the following descriptions of at least one embodiment are merely illustrative, and in no way constitute any limitation on this application and application or use of this application. Technologies, methods, and devices known to those of ordinary skill in related arts may not be discussed in detail, but where appropriate, the techniques, the methods, and the devices should be considered as a part of the specification.

In all examples shown and discussed herein, any specific value should be construed as merely exemplary and not as limitations. Therefore, other examples of embodiments may have different values.

It is to be noted that, similar reference signs or letters in the accompanying drawings indicate similar items. Therefore, once an item is defined in one accompanying drawing, the item does not need to be further discussed in the subsequent accompanying drawings.

An embodiment of the disclosure provides a battery. The battery includes a housing and at least two electrode core sets. The at least two electrode core sets are connected in series with each other. Each electrode core set includes at least one electrode core 4. The electrode core 4 includes a positive plate, a negative plate, and an electrolyte located between the positive plate and the negative plate. The electrolyte is a polymer electrolyte or a solid electrolyte. An isolation layer 43 is arranged between opposite surfaces of two adjacent electrode core sets. The isolation layer 43 is formed by curing an insulation adhesive coated on at least one of the opposite surfaces of the two adjacent electrode core sets.

In the battery provided in this embodiment of the disclosure, the at least two electrode core sets are connected in series inside the housing, that is to say, the at least two electrode core sets share the housing. Compared with a side-by-side arrangement of multiple cells, in this embodiment of the disclosure, outer housings and external mounting structures are reduced, thereby reducing a weight, improving space utilization, and ensuring an overall capacity of a power battery pack. In addition, use of an external power connection component is reduced. The adjacent electrode core sets inside the housing are directly connected in series, without a need to consider connecting stability and reliability of the power connection component. In this way, connection components can be reduced, thereby reducing internal consumption of the power battery pack during use. However, in a case that the electrode core sets are directly connected in series inside the housing, if the electrode core sets come into contact with each other when the battery is squeezed, shaken, or collided during the use, a short circuit is very likely to occur, resulting in a battery failure risk, or even certain safety hazards.

According to the battery provided in some embodiments of the disclosure, an isolation layer 43 is arranged between two adjacent electrode core sets connected in series with each other. The isolation layer 43 is formed by curing an insulation adhesive coated on at least one of the opposite surfaces of the two adjacent electrode core sets. Therefore, even if the two adjacent electrode core sets come into contact with each other when the battery is squeezed or collided, by means of the isolation of the isolation layer 43 formed by the insulation adhesive, a short circuit and ionic interaction does not occur between the two adjacent electrode core sets connected in series, thereby ensuring use reliability and safety of the battery. In addition, the isolation layer 43 can provide heat insulation between the electrode core sets. The isolation layer is formed by curing the insulation adhesive coated on the at least one of the opposite surfaces of the two adjacent electrode core sets. Therefore, an isolation member such as a separator arranged between the electrode core sets is omitted, and use of redundant structural components is minimized. In this way, convenient mounting is achieved, and an assembling process is simple. In addition, compared with the solution of arranging the separator, the weight of the battery can be effectively reduced, thereby facilitating the lightweight design of the battery and reducing costs.

Figure 2:
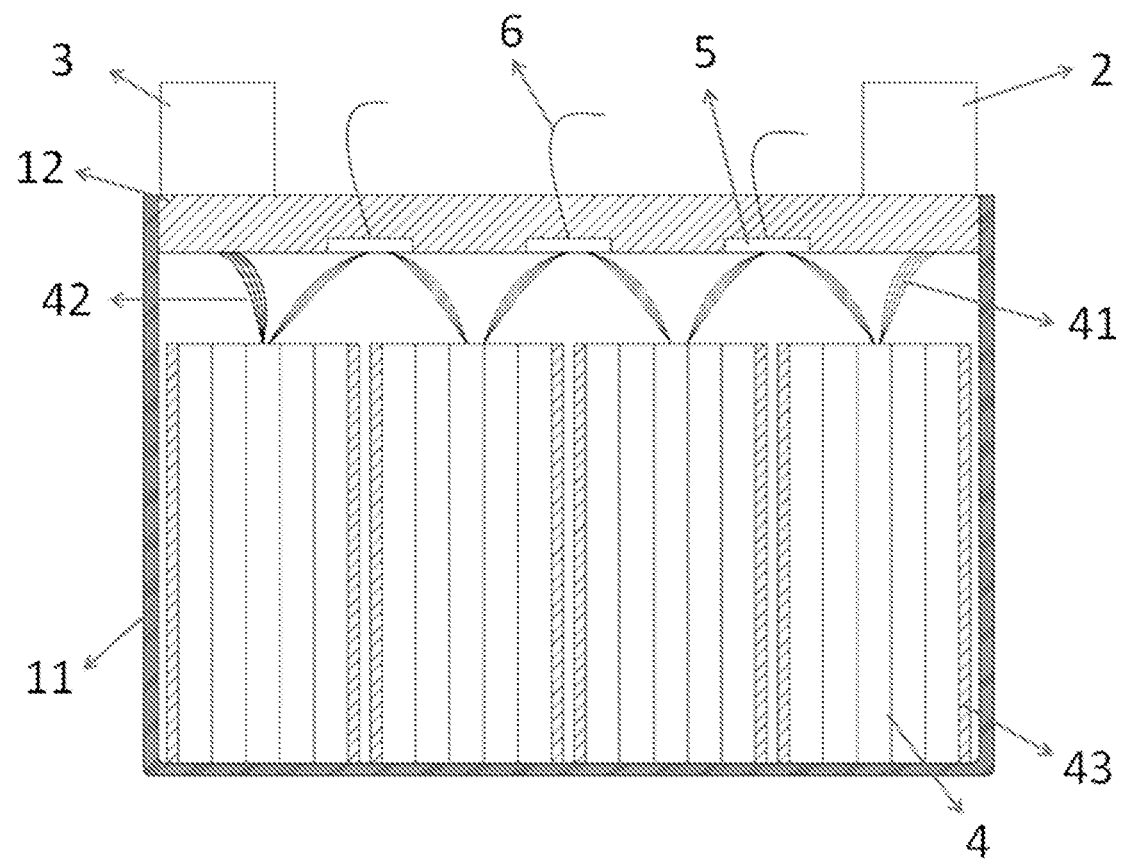
FIG. 2 is a schematic structural cross-sectional view of the battery according to the disclosure.

In the battery provided in this embodiment of the disclosure, referring to FIG. 1 and FIG. 2, the electrode core set may include only a single electrode core 4, or the electrode core set may alternatively include at least two electrode cores 4. The at least two electrode cores 4 may be connected in series and/or in parallel to form the electrode core set. This is not limited in the disclosure. For example, two electrode cores 4 are connected in parallel to form the electrode core set. In an embodiment, four electrode cores 4 are connected in parallel to form the electrode core set. The electrode core 4 is a frequently used electrode core in the field of power batteries. The electrode core 4 may be formed by winding or lamination. Generally, the electrode core 4 includes at least a positive plate, a negative plate, and an electrolyte located between the positive plate and the negative plate.

In the battery provided in this embodiment of the disclosure, the electrolyte is a solid electrolyte or a polymer electrolyte. That is to say, in the battery provided in this embodiment of the disclosure, the electrolyte used in the electrode core 4 is not a liquid electrolyte.

According to the battery provided in some embodiments of the disclosure, the battery is a polymer lithium-ion battery. Generally, the electrode core 4 includes the positive plate, the negative plate, a diaphragm, and the electrolyte. In this case, in the polymer lithium-ion battery, the electrolyte is the polymer electrolyte. The battery may be classified into a liquid lithium-ion battery and the polymer lithium-ion battery in terms of a material of the electrolyte arranged in the battery. The liquid lithium-ion battery uses the liquid electrolyte, and the polymer lithium-ion battery uses the polymer electrolyte. The polymer is generally colloidal rather than liquid.

In some other embodiments of the disclosure, the battery is a solid-state battery. Generally, the electrode core 4 includes the positive plate, the negative plate, and the solid electrolyte. In the solid-state battery, the electrolyte uses the solid electrolyte that is also not liquid.

In the disclosure, one of the reasons why the isolation layer may be arranged only between the opposite surfaces of the two adjacent electrode core sets is that the polymer battery or the solid-state battery is used. That is to say, in the battery provided in the disclosure, the electrolyte is the polymer electrolyte or the solid electrolyte. When the battery is the polymer battery or the solid-state battery, the electrolyte is the polymer electrolyte or the solid electrolyte. The electrolyte can be stably located between the positive plate and the negative plate, and does not flow out from the positions of the positive plate and the negative plate like an electrolyte solution. In a battery having the electrolyte solution, the electrolyte solution flows. Even if the isolation layer is arranged between the opposite surfaces of the two adjacent electrode core sets, the electrolyte solutions of the two adjacent electrode core sets cannot be isolated. In the disclosure, the polymer electrolyte or the solid electrolyte is stably located between the positive plate and the negative plate, and is unlikely to move to other positions. Therefore, an isolation effect can be achieved merely by coating the insulation adhesive on the opposite surfaces. The isolation between the adjacent electrode core sets can be realized merely by arranging the isolation layer between surfaces (between the opposite surfaces) that come into contact with each other.

In the battery provided in this embodiment of the disclosure, the insulation adhesives coated on the surfaces of the electrode core sets are capable of electrical insulation and ionic insulation. In an embodiment, the insulation adhesive includes a resin adhesive and a curing agent added to the resin adhesive. The resin adhesive has the following characteristics: ① The resin adhesive has a specific fluidity and a specific wettability before curing, facilitating uniform coating on the surfaces of the electrode core sets. ② The resin adhesive has a high mechanical strength and extrusion resistance for protecting the electrode core sets. ③ The resin adhesive has few pores and a desirable insulating property. ④ The resin adhesive has a desirable heat insulating property for heat insulation between the electrode core sets. ⑤ The resin adhesive has a low glass transition temperature and a low viscous flow temperature, for facilitating curing.

In an embodiment, the resin adhesive is an air-curing adhesive or a thermosetting adhesive. The air-curing adhesive may be cured by being left still at a natural room temperature. The thermosetting adhesive is required to be heated for curing.

In an embodiment, the resin adhesive is at least one of epoxy resin, polyurethane resin, polyimide, or polyesterimide. The type of the resin adhesive is not limited to those listed above, as long as the characteristics of the above resin adhesive can be satisfied.

In an embodiment, a curing temperature for the curing agent ranges from 25° C. to 100° C. The curing agent is required to have a specific toughness and be effectively bonded with main resin. The curing agent may be a room-temperature curing agent or a moderate-temperature curing agent. A curing temperature for the room-temperature curing agent ranges from 25° C. to 50° C. The room-temperature curing agent includes, but is not limited to, aliphatic polyamine, alicyclic polyamine, low molecular polyamide, and modified aromatic amine. A curing temperature for the moderate-temperature curing agent ranges from 50° C. to 100° C. The moderate temperature curing agent includes, but is not limited to, alicyclic polyamine, tertiary amine, imidazole, and a boron trifluoride complex.

In an embodiment, the insulation adhesive further includes a plasticizer and a filler that are added to the resin adhesive. According to an actual process requirement, additives such as the plasticizer and the filler may be properly added to the resin adhesive, to cause the insulation adhesive to satisfy the process requirement. The plasticizer can increase the toughness of the insulation adhesive. The filler can further improve performance of the insulation adhesive and reduce costs.

In an embodiment, the plasticizer is at least one of an aliphatic dibasic acid ester plasticizer, a polybenzoate plasticizer, an epoxy plasticizer, or a polyester plasticizer. The type of the plasticizer is not limited to those listed above.

In an embodiment, the filler is at least one of a silicate filler, a calcium carbonate filler, or a cellulose filler. The type of the filler is not limited to those listed above.

In an embodiment, a method for preparing and coating the insulation adhesive is as follows: ① The filler is heated, dried, and preheated. ② The resin adhesive is heated to 40° C. to 50° C., and the filler is added to the resin adhesive and mixed well. ③ The curing agent and the plasticizer are added to the resin adhesive and fully mixed until no bubble is generated, so that the required insulation adhesive is prepared. ④ The prepared insulation adhesive is coated or poured on the surfaces of the electrode core sets. If the resin adhesive is the air-curing adhesive, the electrode core sets are left still for several hours to several days until the insulation adhesive is cured. If the resin adhesive is the thermosetting adhesive, the electrode core sets are placed in a heating environment or experience a staged heating process until the insulation adhesive is cured.

In an embodiment, isolation layers 43 are arranged on all of the opposite surfaces of the two adjacent electrode core sets. Although isolation between the electrode core sets can be achieved merely by arranging the isolation layer 43 between the opposite surfaces of the two adjacent electrode core sets, that is, merely by arranging the isolation layer 43 on one of the opposite surfaces of the two adjacent electrode core sets, in order to achieve a more reliable isolation effect, the isolation layers are arranged on all of the opposite surfaces of the two adjacent electrode core sets 43. In this way, the isolation effect is more excellent.

In an embodiment, an insulation film is arranged between the electrode core set and the housing. A material of the insulation film is not specially limited in the disclosure, as long as insulation can be achieved. In some embodiments, a material of the isolation film may include polypropylene (PP), polyethylene (PE), or a multi-layer composite film.

In an embodiment, referring to FIG. 1 and FIG. 2, the housing includes a housing body 11 having an end portion with an opening and a cover plate 12 arranged at the opening of the housing body 11. The cover plate 12 and the housing body 11 are connected and sealed together to define an accommodating cavity. The electrode core sets are located in the accommodating cavity. The housing includes the housing body 11 having the end portion with the opening and the cover plate 12, so that the electrode core sets in the housing can be conveniently assembled. In an embodiment, the cover plate 12 and the housing body 11 are made of a same material, which are both made of a metal material or a plastic material. In an embodiment, the housing body 11 and the cover plate 12 are both integrally formed structures. The housing body 11 and the cover plate 12 that are integrally formed facilitate manufacturing and have a desirable sealing effect.

In an embodiment, referring to FIG. 1 and FIG. 2, grooves are provided on the cover plate 12. Conductive connecting sheets 5 are embedded in the grooves. Specifically, the grooves are provided on a lower surface of the cover plate 12 facing the housing body 11. Each conductive connecting sheet 5 is configured to connect two adjacent electrode core sets in series. Specifically, the conductive connecting sheet 5 is fixed in each groove, to prevent the conductive connecting sheet 5 from shaking or displacing during the use of the battery and thereby affecting reliability of connecting the electrode core sets in series by the conductive connecting sheet 5. In a case that each electrode core set includes only one electrode core 4, as shown in FIG. 1, a positive tab 41 of one of the two adjacent electrode core sets is connected with one end of the conductive connecting sheet 5, and a negative tab 42 of another one of the electrode core sets is connected with another end of the conductive connecting sheet 5.

In an embodiment, the conductive connecting sheet 5 is integrally formed with the cover plate 12. By means of the integral formation, the connection between the conductive connecting sheet 5 and the cover plate 12 becomes firmer and stabler. In an implementation in which each electrode core set includes only one electrode core 4, as shown in FIG. 1, after the insulation adhesive is coated on a surface of the electrode core 4 and cured, the positive tab 41 and the negative tab 42 of the electrode core 4 are connected with the conductive connecting sheet 5 on the cover plate 12 by soldering or riveting. Then the electrode core 4 and the cover plate 12 are placed into the housing body 11 through the open end of the housing body 11. The cover plate 12 covers the opening of the housing body 11. Finally, a periphery of the cover plate 12 is soldered to the housing body 11 for sealing, thereby completing the assembling.

In an embodiment, the conductive connecting sheet 5 includes a copper connection piece and an aluminum connection piece. The copper connection piece is electrically connected with the aluminum connection piece. A position where the copper connection piece is electrically connected with the aluminum connection piece is located in the cover plate 12. In an embodiment, the copper connection piece is first brought into composite connection with the aluminum connection piece to form a composite connection piece. Then the copper connection piece is connected with a copper lead-out terminal of the electrode core set on one side, and the aluminum connection piece is connected with an aluminum lead-out terminal of the electrode core set on another side.

In an embodiment, the battery further includes a detection unit. The detection unit is electrically connected with the electrode core set and is configured to detect a status of the electrode core set. The status of the electrode core set is generally a signal such as a temperature signal and a voltage signal of each electrode core set.

In an embodiment, referring to FIG. 1, the detection unit is a sampling line 6. The sampling line 6 is connected with the conductive connecting sheet 5. In order to accurately collect signals in the battery in real time, one sampling line 6 is connected with each conductive connecting sheet 5. The sampling line 6 is led out of the battery above the cover plate 12, to accurately record the temperature signal and the voltage signal of each electrode core set.

In an embodiment, an insulation layer is arranged between the conductive connecting sheet 5 and the cover plate 12. Since the conductive connecting sheet 5 is made of a metal composite material including copper and aluminum, when the cover plate 12 is made of a metal material, the insulation layer is required to be arranged between the conductive connecting sheet 5 and the cover plate 12. In an embodiment, the insulation layer is made of plastic cement or plastic. Definitely, the insulation layer may be made of other insulation materials. This is not specially limited in the disclosure.

Figure 3:
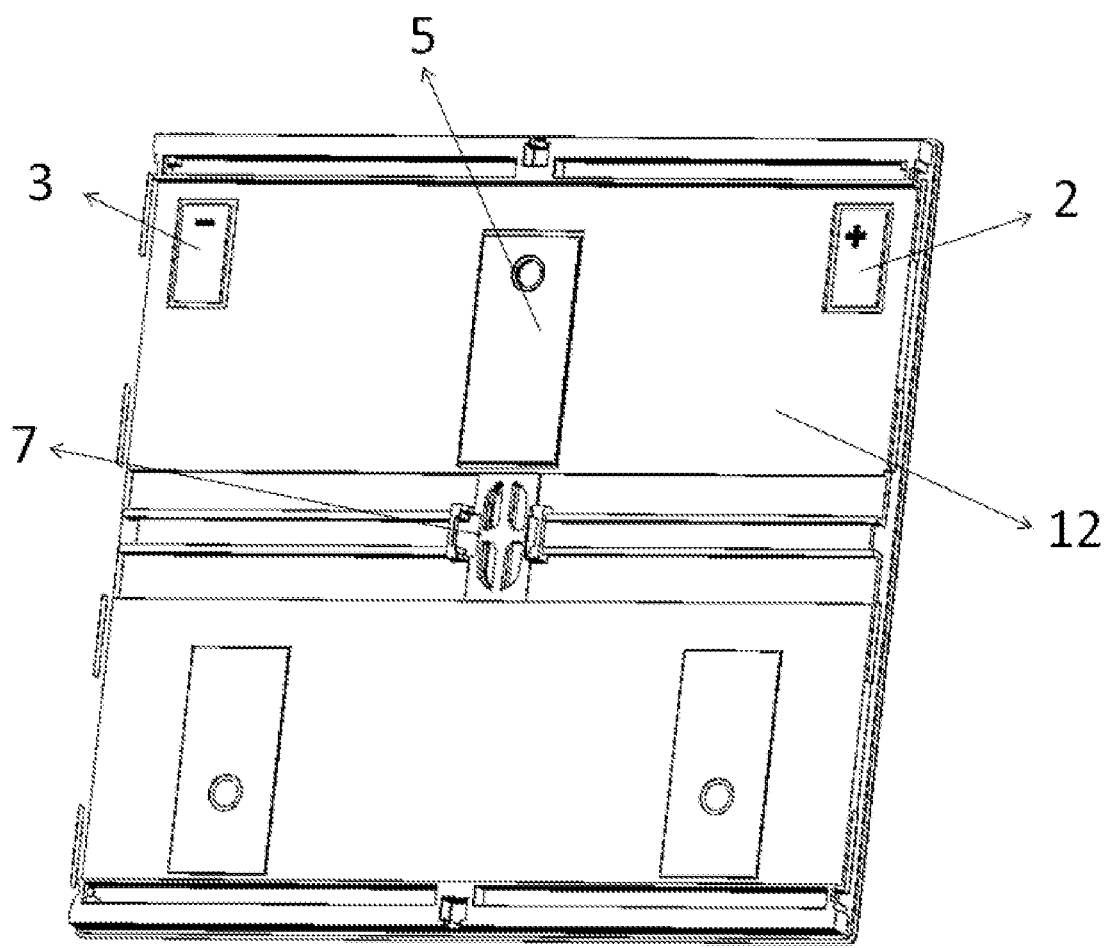
FIG. 3 is a schematic structural diagram of a cover plate in the battery according to the disclosure.

In an embodiment, referring to FIG. 3, an explosion-proof valve 7 is arranged on the cover plate 12. The explosion-proof valve 7 is configured to be opened to release pressure when a pressure value in the battery exceeds a pressure threshold. By means of the explosion-proof valve 7, safety of the use of the battery can be ensured. When a pressure value in the battery exceeds a safe pressure threshold, the explosion-proof valve 7 can be automatically opened to release the pressure in the battery, so that a risk of explosion due to an excessively large internal pressure of the battery can be effectively prevented.

In an embodiment, referring to FIG. 1, a positive pole 2 and a negative pole 3 are arranged on the housing. In the embodiment in which the housing includes the housing body 11 and the cover plate 12, the positive pole 2 and the negative pole 3 are arranged on the cover plate 12. Each electrode core set has a current lead-out member. In the embodiment shown in FIG. 1, the at least two electrode core sets are arranged in a line. The at least two electrode core sets are successively connected in series. The positive pole 2 on the housing is connected with the current lead-out member of the first electrode core set in a series connection direction. The negative pole 3 on the housing is connected with the current lead-out member of the last electrode core set in the series connection direction. In a case that the electrode core set includes only one electrode core 4, the current lead-out member of the electrode core set is the positive tab 41 and the negative tab 42 of the electrode core 4. The positive pole 2 on the housing is connected with the positive tab 41 of the first electrode core set in the series connection direction. The negative pole 3 on the housing is connected with the negative tab 42 of the last electrode core set in the series connection direction. In a case that the electrode core set includes multiple electrode cores 4 connected in parallel, the positive tabs 41 of the multiple electrode cores 4 are connected to form a positive lead, and the negative tabs 42 of the multiple electrode cores 4 are connected to form a negative lead. In this case, the current lead-out member is the positive lead and the negative lead. The positive pole 2 on the housing is connected with the positive lead of the first electrode core set in the series connection direction. The negative pole 3 on the housing is connected with the negative lead of the last electrode core set in the series connection direction.

Figure 4:
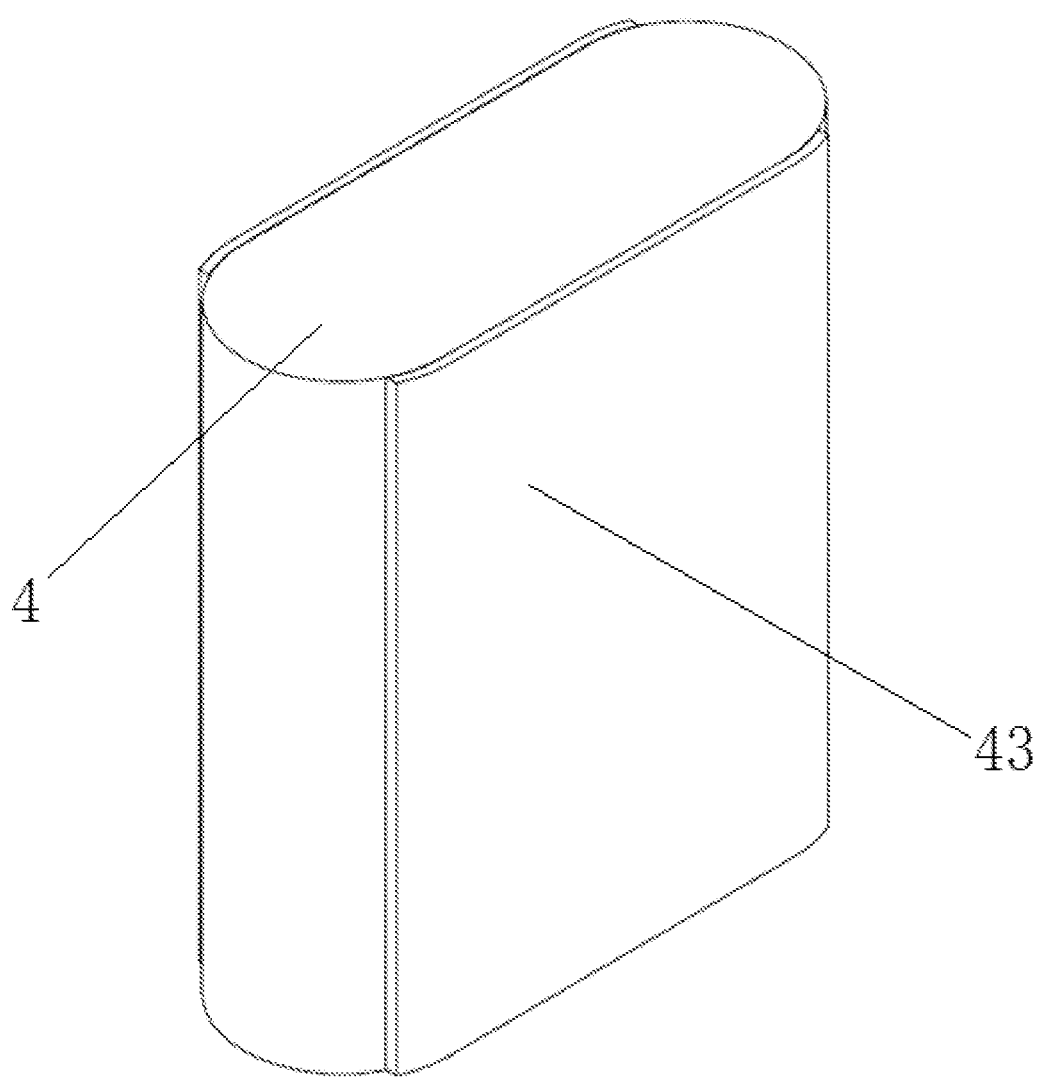
FIG. 4 is a schematic diagram of an embodiment of arranging an isolation layer on a lateral surface of an electrode core set in the battery according to the disclosure.
Figure 5:
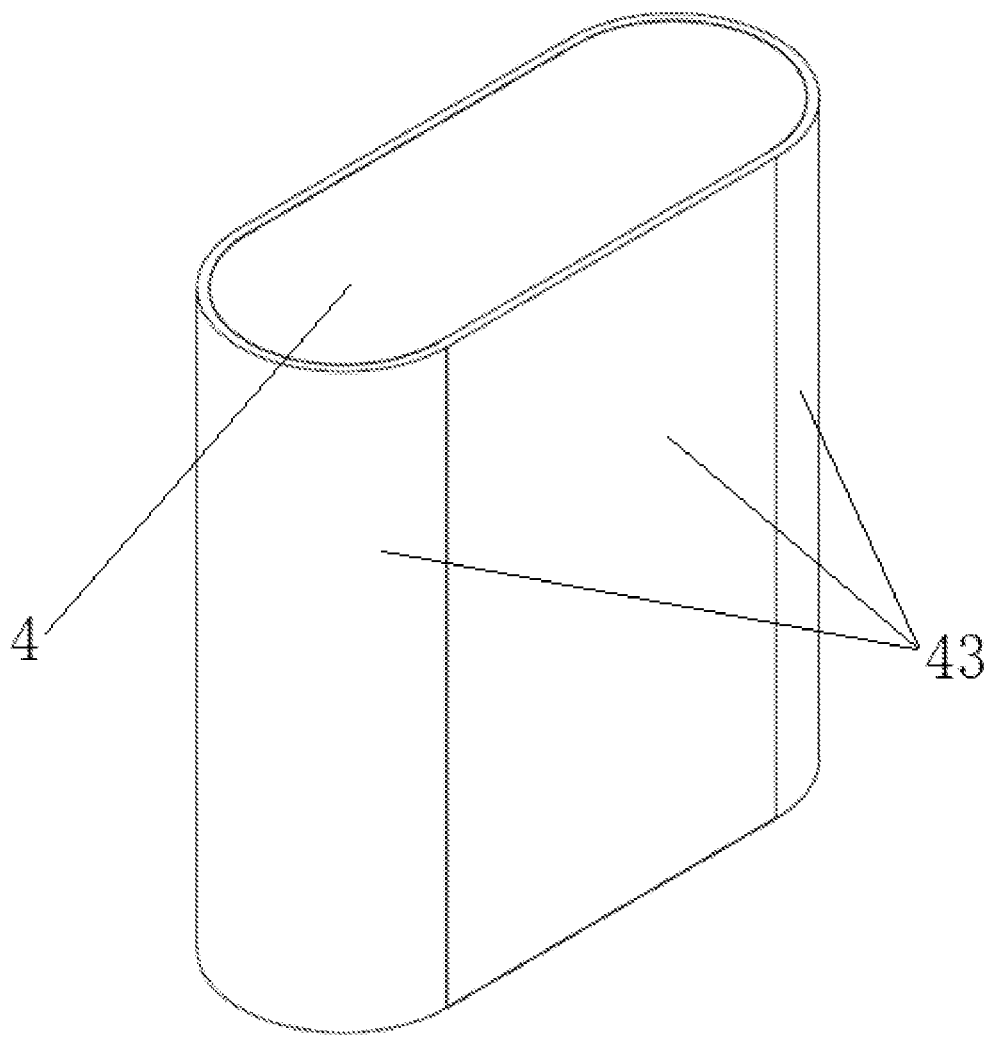
FIG. 5 is a schematic diagram of another embodiment of arranging an isolation layer on a lateral surface of an electrode core set in the battery according to the disclosure.

In an embodiment, the electrode core set includes two end surfaces and lateral surfaces located between the two end surfaces. It may be understood that, when the electrode core sets are cuboid-shaped or approximately cuboid-shaped, each electrode core set has four lateral surfaces. Two opposite lateral surfaces of the four lateral surfaces are larger lateral surfaces having a larger area, and the other two opposite lateral surfaces of the four lateral surfaces are smaller lateral surfaces having a small area. In an embodiment, the opposite surfaces of the two adjacent electrode core sets are the lateral surfaces. The isolation layer 43 is arranged on at least one of the lateral surfaces of the two adjacent electrode core sets. It may be understood that, the opposite surfaces of the two adjacent electrode core sets are the larger lateral surfaces or the smaller lateral surfaces. Regardless of whether the electrode core sets are arranged with the larger lateral surfaces or the smaller lateral surfaces opposite to each other, the isolation layer 43 is required to be arranged on only the at least one of the lateral surfaces of the two adjacent electrode core sets. The isolation layer 43 may be arranged on each of the opposite surfaces in the two adjacent electrode core sets. Referring to FIG. 4, the isolation layer 43 may be arranged on each of the two opposite lateral surfaces of each electrode core set, for example, the two opposite larger lateral surfaces of each electrode core set. Referring to FIG. 5, the isolation layer 43 may be arranged on all of the lateral surfaces of each electrode core set.

In an embodiment, the electrode core set includes two end surfaces and lateral surfaces located between the two end surfaces. The isolation layer 43 is arranged on each of the lateral surfaces of each electrode core set. For the cuboid-shaped electrode core set, the isolation layer 43 is arranged on a total of four lateral surfaces, that is, the two opposite larger lateral surfaces and the two opposite smaller lateral surfaces. In this way, the isolation effect can be more excellent and reliable. In addition, the electrode core sets can be arranged with any lateral surfaces opposite to each other.

In an embodiment, the electrode core set includes two end surfaces and lateral surfaces located between the two end surfaces. The opposite surfaces of the two adjacent electrode core sets are the end surfaces. The isolation layer 43 is arranged on at least one of the end surfaces of the two adjacent electrode core sets. In the arrangement, the electrode core sets are arranged with end surface to end surface, that is, head to head. Therefore, the isolation layer 43 is required to be arranged on the end surface of the electrode core set. The isolation layer 43 is required to be arranged on only the end surface of one of the two opposite electrode core sets. The isolation layers 43 may be arranged on each of the end surfaces of the two adjacent electrode core sets.

An embodiment of the disclosure further provides a battery module. The battery module includes at least two batteries described above. The at least two batteries in the battery module may be connected in series and/or in parallel. A detection sampling component may be arranged on the battery module, and is configured to independently supply power to the battery module.

An embodiment of the disclosure further provides a battery pack. The battery pack includes at least two batteries described above or at least one battery module described above. The at least two batteries or the at least two battery modules in the battery pack may be connected in series and/or in parallel. A detection sampling component may be arranged on the battery pack, and is configured to independently supply power to the battery pack.

An embodiment of the disclosure further provides an electric vehicle. The electric vehicle includes the battery module described above or the battery pack described above. The battery module or the battery pack both can independently supply power to the electric vehicle.

Although some specific embodiments of this application have been described in detail by way of examples, a person skilled in the art should understand that the foregoing examples are only for description and are not intended to limit the scope of this application. A person skilled in the art should appreciate that modifications may be made to the foregoing embodiments without departing from the scope and spirit of this application. The scope of this application is limited only by the appended claims.

What is claimed is:

1. A battery, comprising:
a housing; and
at least two electrode core sets, connected in series with each other, and each electrode core set comprising at least one electrode core, wherein the electrode core comprises a positive plate, a negative plate, and an electrolyte located between the positive plate and the negative plate, and the electrolyte is a solid electrolyte or a polymer electrolyte; and
wherein at least an isolation layer is arranged between opposite surfaces of two adjacent electrode core sets and coated on a first one of the opposite surfaces of a first electrode core set of the two adjacent electrode core sets, a gap is formed between the isolation layer and a second one of the opposite surfaces of a second electrode core set of the two adjacent electrode core sets, and the isolation layer comprises a cured insulation adhesive.

2. The battery according to claim 1, wherein the cured insulation adhesive comprises a resin adhesive and a curing agent added to the resin adhesive.

3. The battery according to claim 2, wherein the resin adhesive is an air-curing adhesive or a thermosetting adhesive.

4. The battery according to claim 2, wherein the resin adhesive comprises at least one of epoxy resin, polyurethane resin, polyimide, or polyesterimide.

5. The battery according to claim 2, wherein a curing temperature for the curing agent ranges from 25° C. to 100° C.

6. The battery according to claim 2, wherein the curing agent comprises at least one of aliphatic polyamine, alicyclic polyamine, low molecular polyamide, modified aromatic amine, tertiary amine, imidazole, or a boron trifluoride complex.

7. The battery according to claim 2, wherein the resin adhesive comprises a plasticizer and a filler.

8. The battery according to claim 7, wherein the plasticizer comprises at least one of an aliphatic dibasic acid ester plasticizer, a polymeric benzoate ester plasticizer, an epoxy plasticizer, or a polyester plasticizer.

9. The battery according to claim 7, wherein the filler comprises at least one of a silicate filler, a calcium carbonate filler, or a cellulose filler.

10. The battery according to claim 1, wherein two isolation layers are respectively disposed on the opposite surfaces of the two adjacent electrode core sets, and a gap is formed between the two isolation layers.

11. The battery according to claim 1, wherein the housing comprises a housing body having an end portion with an opening, and a cover plate arranged at the opening of the housing body; grooves are provided on the cover plate; conductive connecting sheets are embedded in the grooves; and each of the conductive connecting sheets is configured to connect two adjacent electrode core sets in series.

12. The battery according to claim 11, wherein the conductive connecting sheets and the cover plate are made of a metal material; and an insulation layer is arranged on an outer surface of each of the conductive connecting sheets for insulating the conductive connecting sheets from the cover plate.

13. The battery according to claim 1, wherein each of the at least two electrode core sets comprises two end surfaces and lateral surfaces located between the two end surfaces; lateral surfaces of the two adjacent electrode core sets comprise the opposite surfaces of the two adjacent electrode core sets; and the isolation layer is arranged on at least one of the lateral surfaces of the two adjacent electrode core sets.

14. The battery according to claim 1, wherein each of the at least two electrode core sets comprises two end surfaces and lateral surfaces located between the two end surfaces; and an isolation layer is arranged on each of the lateral surfaces of each of the at least two electrode core sets.

15. The battery according to claim 1, wherein each of the at least two electrode core sets comprises two end surfaces and lateral surfaces located between the two end surfaces; end surfaces of the two adjacent electrode core sets comprise the opposite surfaces of the two adjacent electrode core sets; and the isolation layer is arranged on at least one of the end surfaces of the two adjacent electrode core sets.

16. A battery module, comprising at least two batteries according to claim 1.

17. A battery pack, comprising at least two batteries, wherein each of the at least two batteries comprises:
a housing; and
at least two electrode core sets, connected in series with each other, and each electrode core set comprising at least one electrode core, wherein the electrode core comprises a positive plate, a negative plate, and an electrolyte located between the positive plate and the negative plate, and the electrolyte is a solid electrolyte or a polymer electrolyte; and
wherein at least an isolation layer is arranged between opposite surfaces of two adjacent electrode core sets and coated on a first one of the opposite surfaces of a first electrode core set of the two adjacent electrode core sets, a gap is formed between the isolation layer and a second one of the opposite surfaces of a second electrode core set of the two adjacent electrode core sets, and the isolation layer comprises a cured insulation adhesive.

18. An electric vehicle, comprising a battery pack, wherein the battery pack comprises at least two batteries, and each of the at least two batteries comprises:
a housing; and
at least two electrode core sets, connected in series with each other, and each electrode core set comprising at least one electrode core, wherein the electrode core comprises a positive plate, a negative plate, and an electrolyte located between the positive plate and the negative plate, and the electrolyte is a solid electrolyte or a polymer electrolyte; and
wherein at least an isolation layer is arranged between opposite surfaces of two adjacent electrode core sets and coated on a first one of the opposite surfaces of a first electrode core set of the two adjacent electrode core sets, a gap is formed between the isolation layer and a second one of the opposite surfaces of a second electrode core set of the two adjacent electrode core sets, and the isolation layer comprises a cured insulation adhesive coated on at least one of the opposite surfaces of the two adjacent electrode core sets.

* * * * *